United States Patent [19]

Barrer et al.

[11] Patent Number: 5,108,631
[45] Date of Patent: Apr. 28, 1992

[54] METHOD OF OVERBASING WITH A HYDROXY SULFONIC ACID COPROMOTER

[75] Inventors: Daniel E. Barrer, Euclid; Jack L. Karn, Richmond Heights, both of Ohio

[73] Assignee: The Lubrizol Corporation, Wickliffe, Ohio

[21] Appl. No.: 584,212

[22] Filed: Sep. 18, 1990

Related U.S. Application Data

[63] Continuation of Ser. No. 100,159, Sep. 23, 1987, abandoned, which is a continuation of Ser. No. 23,421, Mar. 9, 1987, abandoned.

[51] Int. Cl.$^5$ .................................. C10M 135/10
[52] U.S. Cl. ...................................... 252/18; 252/33; 562/41; 562/42; 562/111
[58] Field of Search ................ 252/18, 33; 562/41, 562/42, 111

[56] References Cited

U.S. PATENT DOCUMENTS

| | | | |
|---|---|---|---|
| 2,585,520 | 2/1952 | Van Ess et al. | 252/33 |
| 2,616,911 | 11/1952 | Asseff et al. | 260/413 |
| 2,616,924 | 11/1952 | Asseff et al. | 260/504 |
| 2,616,925 | 11/1952 | Asseff et al. | 260/504 |
| 2,695,910 | 11/1954 | Asseff et al. | 260/413 |
| 3,006,952 | 10/1961 | Logan | 260/504 |
| 3,057,896 | 10/1962 | Schlicht et al. | 260/435 |
| 3,595,790 | 7/1971 | Norman et al. | 252/32.7 E |
| 3,714,042 | 1/1973 | Greenough | 252/33.2 |
| 4,049,560 | 9/1977 | Dominey | 252/33.3 |
| 4,051,047 | 9/1977 | Liston | 252/33 |
| 4,057,504 | 11/1977 | Shiga et al. | 252/33 |
| 4,261,840 | 4/1981 | Gragson | 252/33.4 |
| 4,615,841 | 10/1986 | Stamatakis | 260/505 |

*Primary Examiner*—Prince Willis, Jr.
*Assistant Examiner*—Jerry D. Johnson
*Attorney, Agent, or Firm*—James L. Cordek; Frederick D. Hunter; Joseph P. Fischer

[57] ABSTRACT

Overbased salt compositions are formed by reacting a hydreocarbyl substituted sulfonic acid or salt thereof with a basic neutralizing agent, in the presence of a hydroxy sulfonic acid or salt thereof. The overbased salt composition is preferably overbased by casrbonating via $CO_2$ bubbling. Mixed overbased salts and compositions containing the mixed salts are disclosed as well as lubricating compositions containing such salts. The lubricating compositions have particularly good clarity.

15 Claims, No Drawings

METHOD OF OVERBASING WITH A HYDROXY SULFONIC ACID COPROMOTER

CROSS-REFERENCE TO RELATED APPLICATIONS

This application is a continuation of Ser. No. 07/100,159 filed on Sep. 23, 1987 now abandoned which itself is a continuation of Ser. No. 07/23,241 filed Mar. 9, 1987 and now abandoned.

FIELD OF THE INVENTION

This invention relates to the field of methods of overbasing as well as overbased compounds and compositions containing such. More specifically, the invention relates to overbasing hydrocarbyl substituted sulfonic acid or a salt thereof using a copromoter in the form of hydroxy substituted sulfonic acids or salts thereof in order to obtain an overbased compound which exhibits improved clarity in oil.

BACKGROUND OF THE INVENTION

To provide an understanding of the importance of the present invention, some discussion of the general class of compounds which might be produced using the invention is in order. The term "detergent" describes such a general class of compounds. Such compounds have the ability to reduce or prevent deposits in engines operated at high temperatures. Additives which disperse sludge formed in engines operated at relatively low temperatures (e.g., those prevailing in short trip, stop-and-go driving conditions) are now termed "dispersants," even though the ultimate result flowing from their use, a "clean" engine, presumes a "detergent" or cleansing action.

The first detergent additives, employed commercially in the late thirties to reduce ring-sticking and ring-groove carbon in diesel engines, were oil-soluble polyvalent metal salts or "soaps" of high molecular weight carboxylic acids. Among the more widely used varieties of salts were aluminum naphthenate, calcium dichlorostearate, calcium phenylstearate, and calcium chlorophenylstearate. Although these additives were effective in improving piston cleanliness and extending the service life of diesel engines between overhauls, they were corrosive to sensitive bearing metals and such corrosion could not be controlled satisfactorily by inhibitors available at the time. They became obsolete when hard but corrosion-susceptible copper-lead bearings began to replace soft but corrosion-resistant Babbitt bearings in the early forties. For a brief period between the obsolescence of carboxylic acid salts and the emergence of detergents which are still used commercially today, oil-soluble polyvalent metals salts (i.e., phenates) of long chain alcohol esters of salicyclic acid found considerable commercial favor. Examples of such salicylate ester salts include magnesium lauryl salicyclate, calcium lauryl salicylate, and calcium octadecyl salicylate. Despite the fact that the prototypes of such detergent additives were first introduced in the 1940 decade, they have retained their commercial importance—in many instances because of improved processing or "chemical modification" techniques which increased their effectiveness substantially.

The following list refers to families of detergent additives believed to be in substantial commercial use:

Sulfonates—The normal and basic metal salts of petroleum sulfonic ("mahogany") and long chain alkyl substituted benzene sulfonic acids.

Phosphonates and/or Thiophosphonates—The normal and basic metal salts of the phosphonic and/or thiophosphonic acids obtained from the reaction of polyolefins such as polyisobutenes with inorganic phosphorus reagents (principally phosphorus pentasulfide).

Phenates—The normal and basic metal salts of alkylphenols, alkylphenol sulfides, and alkylphenol-aldehyde condensation products.

Alkyl Substituted Salicylates—The normal and basic metal salts (carboxylate and carboxylate-phenate salts) of long chain alkyl substituted salicylic acids. These products should not be confused with the obsolete metal phenates of salicyclic acid esters mentioned earlier.

An understanding of the terms "normal salt" and "basic salt" is important with respect to the present invention. A normal salt of an acid is one which contains the stoichiometric amount of metal required for the neutralization of the acidic group or groups present. A basic salt is one which contains more metal than is required for the indicated neutralization reaction. Such excess metal may be present due to a true basic salt structure

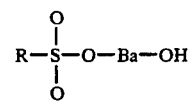

(postulated structure of basic barium sulfonate containing twice as much barium as the normal sulfonate) or it may be present in the form of colloidally-dispersed metallic base (hydroxide, oxide, carbonate, etc.).

The excess metal in basic salts is capable of neutralizing acidic contaminants (principally oil oxidation and "blow-by" fuel combustion products) found in used crankcase oils, with the result that corrosive wear of an engine is reduced. Practically all current commercial detergent additives are basic salts. Much has been written on the chemistry of basic detergent additives and their ability to reduce corrosive wear of engines.

Normal metal sulfonates derived from "mahogany" acids (the mahogany-colored petroleum sulfonic acids obtained as a by-product during white oil manufacture) were first employed as detergent additives in commercial crankcase oils during World War II. Almost without exception, the metals present in such sulfonates were calcium or barium. Petroleum sulfonates not only imparted a greater degree of detergency to lubricating oils than carboxylic acid soaps or salicylate ester salts, but were much less corrosive to sensitive bearing metals and responded well to known corrosion inhibitors.

In the period between the close of World War II and 1950, research carried out on petroleum sulfonates indicated that basic products could be prepared by various processing techniques, most of which involve heating the sulfonate with an excess of a metallic base and water at an elevated temperature. These products were found to contain up to twice as much metal as the corresponding normal sulfonates. They soon supplanted normal sulfonates in lubricant formulations because of their superior detergent power and their ability to neutralize acidic contaminants and reduce corrosive wear of engine piston rings and cylinder bores.

The next important development in the continuing research effort to improve the effectiveness of sulfonate detergents occurred in the early fifties, when methods were discovered by which one could prepare fully oil-soluble sulfonates containing from 3 to 10 or 15 times as much metal as the corresponding normal sulfonates. Such highly basic sulfonates, to which coined terms such as "overbased," "superbasic," and "hyperbasic" have been applied in the trade, were found to possess unusually high detergent power and, as might be anticipated, a great capacity to neutralize acidic contaminants.

Hereinafter the term "overbased" will be used. The present invention involves a specific method for making such overbased salts. The manufacture of such overbased sulfonates generally involves a mixing of certain promoters, catalysts, or solvents with a normal sulfonate and a large excess of metallic base, followed by heating and filtration steps. Prior to filtration, carbonation of the reaction mass with carbon dioxide is often used to increase the amount of metal base colloidally dispersed as metal carbonate in the filtered product.

Suitable promoters or catalysts for overbasing processes include phenols (see U.S. Pat. No. 2,616,924); thioacids of phosphorus (see U.S. Pat. No. 2,616,925); alcoholates (see U.S. Pat. No. 2,585,520); alcohols (see U.S. Pat. No. 3,057,896); ketones (see U.S. Pat. No. 3,006,952); and alkanolamines. Metallic bases employed in the preparation of overbased sulfonates are for the most part basic compounds of alkaline earth metals such as calcium, barium, or magnesium.

U.S. Pat. No. 4,261,840 discloses lubricating greases which are formed by overbasing a mixture comprised of a lubricating oil, an alkaline earth metal petroleum sulfonate, and a lower molecular weight sulfonic acid derivative. This patent like the other patents referred to below discusses methods for carrying out overbasing procedures which methods are somewhat more current than the patents referred to above.

U.S. Pat. No. 4,057,504 discloses a method of preparing an overbased lubricating oil additive. The method includes introducing carbon dioxide into a mixture containing an oil-soluble organic acid or metal salt thereof, which acid or salt includes a hydrocarbon having 18 to 150 carbon atoms and an alkaline earth metal compound. The carbon dioxide is introduced at a temperature higher than about 100° C. in a reaction medium of lubricating oil in the presence of a reaction accelerator comprised of a dihydric alcohol, a phenol compound and sulfur. The reaction which takes place completes the carbonation after which all of the volatile components contained in the reaction product are removed.

U.S. Pat. No. 4,051,047 discloses group II metal mixed salts of (A) an oil-soluble hydrocarbyl sulfonic acid; and (B) a polyoxyalkylenated sulfuric acid. Such mixed salts are indicated as being useful rust inhibitors in lubricating oil compositions.

U.S. Pat. No. 4,049,560 discloses a method of producing overbased magnesium phenate detergents. The method includes carbonating a mixture of a sulfur containing phenol, a smaller amount of a sulfonic acid, sulfonate or sulfate, an alcohol, magnesium oxide or hydroxide and a carboxylic acid anhydride or salt thereof. The detergent additives produced by the product are indicated as being useful in connection with lubricating oils.

U.S. Pat. No. 4,615,841 discloses a process for making alkaline-earth metal salts of alkaryl sulfonic acids. The method involves reacting an alkaryl sulfonic acid with alkaline-earth metal oxide in an organic solvent in the presence of 0.05 to less than 2.5 weight percent water.

SUMMARY OF THE INVENTION

A method of producing overbased compounds and compositions is disclosed. The method of the present invention is particularly advantageous (in obtaining clear oil compositions with overbased additive therein) due to the use of copromoters in the form of hydroxy substituted sulfonic acids and salts thereof. The copromoters used in connection with the present invention are encompassed by the general structural formula (I):

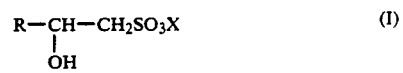

wherein R is a hydrocarbyl moiety and X is a cation, preferably in the form of a cation of Na, Mg, Ca, Ba or ammonia.

A primary object of the present invention is to provide an overbased composition using an improved and novel copromoter.

A feature of the present invention is the use of a novel copromoter in the form of hydroxy substituted sulfonic acids and salts thereof.

An advantage of the present invention is that it allows overbasing to be efficiently carried out to obtain an oil composition with an overbased additive therein, which oil composition exhibits particularly good clarity.

Another advantage of the present invention is that it can improve the commercial marketability of the invention by providing oil additive concentrates and oils with improved clarity.

These and other objects, advantages and features of the present invention will become apparent to those persons skilled in the art upon reading the details of the synthesis and useage as more fully set forth below. Reference being made to the accompanying general structural formulae forming a part hereof wherein like symbols refer to like molecular moieties throughout.

DETAILED DESCRIPTION OF THE PREFERRED EMBODIMENTS

Before the present method of overbasing with a hydroxy sulfonic acid copromoter and means for utilizing such are described, it is to be understood that this invention is not limited to the particular compounds or process steps described as such compounds and steps may, of course, vary. It is also understood that the terminology used herein is for the purpose of describing particular embodiments only, and is not intended to be limiting since the scope of the present invention will be limited only by the appended claims.

The present invention is a novel process for preparing an overbased salt composition. The process involves reacting a hydrocarbyl substituted sulfonic acid or salt thereof with a basic metal neutralizing agent, in the presence of a copromoter in the form of a hydroxy substituted sulfonic acid or salt thereof to provide an overbased reaction product. The overbased reaction product is preferably carbonated in order to enhance overbasing.

The present invention also includes novel overbased salt compositions produced by the above referred to process and novel mixed salts obtained from such a process. In addition the present invention is directed to various lubricating compositions produced by the process of the invention. Such lubricating compositions include those which contain overbased compositions, motor oils, functional fluids, and greases which have improved clarity.

The copromoter used in the process of the present invention is the essence of the present invention. The copromoter may be represented by the general structural formula (I):

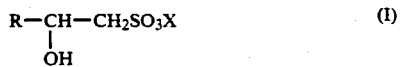
$$R-CH-CH_2SO_3X \quad (I)$$
$$\phantom{R-}|\phantom{CHC}$$
$$\phantom{R-}OH$$

wherein R is hydrocarbyl and X is a cation.

R is preferably present in the form of an alkyl moiety. The alkyl moiety may contain 6 to 50 carbons, preferably contains 8 to 20 carbons and more preferably 10 to 18 carbons. A particularly useful copromoter includes a mixture of compounds wherein R ranges from 10 to 18 carbon atoms. The particularly preferred mixture is a "statistical mixture" of compounds wherein the compounds vary, one from the other, in small increments over the range of 10 to 18 carbon atoms. These mixtures may be used in the form of aqueous dispersions.

The substituent groups for the above formula (I) will now be described in greater detail in order to disclose and describe a representative number of examples of copromoter compounds used in the process of the invention and to disclose preferred and particularly preferred embodiments of such copromoters.

In formula (I), R is hydrocarbyl meaning "hydrocarbon-based". As used herein, the term "hydrocarbon-based", "hydrocarbon-based substituent" and the like denotes the substituent having a carbon atom directly attached to the remainder of the molecule and having predominantly hydrocarbyl character within the context of this invention.

Examples of hydrocarbyl substituents which might be useful in connection with the present invention include the following:

(1) hydrocarbon substituents, that is, aliphatic (e.g., alkyl or alkenyl), alicyclic (e.g., cycloalkyl, cycloalkenyl) substituents, aromatic, aliphatic and alicyclic-substituted aromatic nuclei and the like as well as cyclic substituents wherein the ring is completed through another portion of the molecule (that is, for example, any two indicated substituents may together form an alicyclic radical);

(2) substituted hydrocarbon substituents, that is, those substituents containing nonhydrocarbon radicals which, in the context of this invention, do not alter the predominantly hydrocarbon substituent; those skilled in the art will be aware of such radicals (e.g., halo (especially chloro and fluoro), alkoxy, mercapto, alkylmercapto, nitro, nitroso, sulfoxy, etc.);

(3) hetero substituents, that is, substituents which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as, e.g., pyridyl, furanyl, thiophenyl, imidazolyl, etc., are exemplary of these hetero substituents.

In general, no more than about three radicals or heteroatoms and preferably no more than one, will be present for each ten carbon atoms in the hydrocarbon-based substituents. Typically and preferably, there will be no such radicals or heteroatoms in the hydrocarbon-based substituent and it will, therefore, by purely hydrocarbon.

Specific examples of preferred R groups include straight and branched chain alkyl and alkenyl moieties containing 1 to 50 carbons. More preferably R contains 8 to 20 carbons with a particular preferred R being a statistical mixture of alkyl moieties containing 10 to 18 carbons.

More preferred examples of hydroxy substituted sulfonic acids or salts used as copromoter in the process of the present invention are, represented by the general structural formula (II):

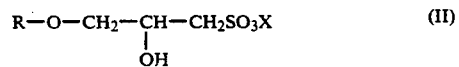
$$R-O-CH_2-CH-CH_2SO_3X \quad (II)$$
$$\phantom{R-O-CH_2-}|\phantom{CH-CHSO}$$
$$\phantom{R-O-CH_2-}OH$$

The acid form, i.e., when X is H, is particularly useful in that it can be easily converted to any desired salt. A particularly useful form of the copromoter of formula (II) is a statistical mixture of compounds of (II) wherein R is an alkyl moiety and varies over a range 10 to 18 carbons.

The variable X, when separated from the molecule is a cation. Examples of such include cations generally useful where oil additives are concerned include H, Ca, Mg, Na, Zn, Ba, Li, K, NH$_4$, and amines such as diethyl amine and triethyl amine. Preferred examples of X include cations of H, Na, Ca, Mg, NH$_4$ and Zn. The acid form, i.e., when X is H is particularly useful in that it may be easily converted to a particularly useful salt such as a Ca, Na or NH$_4$ salt.

The terms "overbased salt", "overbased salt complex" and "basic salt" are used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. Overbased salts can also be prepared by such a procedure. However, when a high degree of overbasing is required the overbased salts are generally obtained by bubbling CO$_2$ through the acid/base reactant.

The use of a "promoter" in the neutralization step to aid the incorporation of a large excess of metal likewise is known. Examples of compounds useful as the promoter include methanol present along with phenolic substances such as phenol, naphthol, alkylphenols, thiophenol, sulfurized alkylphenols, and condensation products of formaldehyde with phenolic substances. A methanol promoter may also be present along with other alcohols such as 2-propanol, octyl alcohol, Cellosove, Carbitol, ethylene glycol, stearyl alcohol and cyclohexyl alcohol; and amines such as aniline, phenylenediamine, phenothiazine, phenyl-beta-naphthylamine and dodecylamine. The present inventors have found that the use of methanol with a 50/50 mixture of isobutanol and amyl alcohols are particularly preferred promoters.

Effective methods which were used for preparing basic salts involve mixing an acid with an excess of a basic alkaline earth or alkali earth metal neutralizing agent and at least one alcohol promoter, and carbonating the mixture. Overbased complexes are disclosed in U.S. Pat. No. 3,714,042 which is incorporated herein by reference to disclose such complexes and information with respect to how these complexes might be produced.

A process of the present invention for preparing a basic salt might be carried out as follows: First react hydrocarbyl substituted sulfonic acid or salt thereof with an excess of a basic alkaline or alkali earth metal neutralizing agent in the presence of a hydroxy sulfonic acid or salt thereof (such as a statistical mixture of compounds encompassed by general structural formula I or II). The reaction is preferably carried out in the presence of a methanol promoter, most preferably in combination with a promoter in the form of a 50/50 mixture of isobutyl and amyl alcohols. Sufficient salt of the desired type is added to allow for the conversion to the desired salt of the hydroxy sulfonic acid or salt. A two phase reaction is used when converting a hydroxy sulfonic salt to another salt. For example, first add $CaCl_2$ followed by $Ca(OH)_2$ However, a hydroxy substituted sulfonic acid can be directly converted to a Ca salt by adding $Ca(OH)_2$. In order to cause further overbasing the mixture is then carbonated at a temperature in the range of from about 0° to 200° C. while bubbling $CO_2$ through the mixture. The temperature range is more preferably about 25° C. to about 60° C. with a particularly preferred range being about 45° to 55° C. The temperature varies somewhat depending on factors such as the type of alcohol promoter used. If a low boiling point alcohol promoter is used a lower temperature is needed in order to keep the alcohol from being lost by evaporation.

The amount of the copromoter (in the form of a hydroxy substituted sulfonic acid or salt there) used can vary over a wide range and is related to the amount of the hydrocarbyl substituted sulfonic acid or salt thereof being overbased. It might be possible to carry out the process of the present invention wherein the molar ratio of the hydrocarbyl substituted sulfonic acid to the hydroxy substituted sulfonic acid is in the range of (50-1):(1-50). However, the hydroxy substituted sulfonic acid (A) is preferably present in an amount substantially less than that of the hydrocarbyl substituted sulfonic acid (B) so the molar ratio (A):(B) is preferably (1):(5-20) and most preferably about (1):(10).

When the above described process is carried out, the resulting composition will include a large number of different components and as a whole is believed to be a novel composition. There is evidence that the resulting composition is a novel composition. More specifically when such a composition is added to a lubricant the treated lubricant has particular good clarity. Although clarity itself may not directly effect performance, it is a desirable commercial feature of a treated lubricant package. Lubricating compositions which appear cloudy are often unmarketable regardless of their performance characteristics. The improved clarity obtainable by utilizing the present invention not only improves marketability but would allow the end user to more easily determine, by visual means, when the oil was dirty and required changing.

The process of the present invention is believed to result in a novel composition due to the use of the novel copromoter in the form of a hydroxy sulfonic acid or salt thereof. This copromoter is believed to act not merely as a promoter (i.e. catalyst) but to be a reactant itself. Should the sulfonic acid and hydroxy sulfonic acid both act as reactants the result is a mixed overbased salt represented by the general structural formula (III):

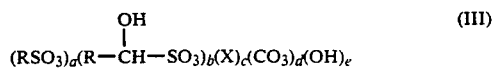

$$(RSO_3)_a(R-\underset{\underset{OH}{|}}{C}H-SO_3)_b(X)_c(CO_3)_d(OH)_e \quad (III)$$

wherein "c" is 1 to 4000, and "a", "b", "d" and "e" vary in order to satisfy the valence requirements of $(X)_c$, wherein X is an alkali or alkaline earth metal, with the proviso that "a" and "b" are each at least one and the salt is overbased. When the salt is overbased "a" is generally several times (e.g. 2 to 40 times) larger then "b", more preferably "a" is 5 to 20 times "b". The value of "c" varies depending on the valence of the metal X and the number of positive charges needed to balance the complex. Preferably X is Ca or Mg.

A typical mixed salt of the present invention (formula III) is overbased to the extent that when "b" is 1 "a" is about 10 and "c" will be about 220 when X is Na ("c" is about 110 when X is Ca). Accordingly, if "b" is 5 "a" is typically about 50 and "c" is about 1,100. The mixed salt has a variety of structures and can not be precisely defined. Any actual composition of the invention would contain a statistical mixture of the salts of formula (III) wherein the variables of formula (III) would vary, in small increments, over a range to provide an average.

The following examples are recited here so as to provide those of ordinary skill in the art with a complete disclosure and description of how to carry out specific embodiments of the invention and are not intended to limit the scope of what the inventors regard as their invention. Efforts have been made to insure accuracy with respect to numbers used (e.g. amounts, temperature, etc.) but some experimental errors and deviation should be accounted for. Unless indicated otherwise, parts are parts by weight, temperature is in degrees C., and pressure is at or near atmospheric.

EXAMPLE I

Charge into a four necked flask equipped with a stirrer, thermowell, thermometer, below surface addition tube and condenser, 1000 parts of alkylbenzene sulfonic acid. Add 100 parts of an alkyl substituted hydroxy sulfonic acid copromoter. Add 200 parts of an alcohol promoter in the form of a mixture of 50% methanol, and 50% normal butanol. Add 500 parts of a diluent oil. Begin overbasing the alkylbenzene sulfonic acid by heating to between 45° and 50° C. and adding incremental amounts of $Ca(OH)_2$ (50 parts) with stirring. Blow with $CO_2$ to carbonate. Several increments of $Ca(OH)_2$ can be added with each incremental addition being followed by blowing with $CO_2$ until desired overbasing is accomplished. When desired overbasing is accomplished, heat to 150° C., blow with $N_2$ to remove water and alcohols and filter to obtain product.

EXAMPLE II

Charge into a four necked flask equipped with a stirrer, thermowell, thermometer, below surface addition tube and condenser, 875 parts of a mixture including a sodium alkylbenzene sulfonate (A) and an alkyl substituted hydroxy sulfonic acid (B) in a molar ratio of (A)/(B) of 1.2/0.06. Add 37.5 parts of a calcium formaldehyde coupled alkyl phenol present in 390 parts of a diluent oil. Add 150 parts of an alcohol mixture including methanol, amyl alcohols and normal butanol. Heat to about 60° C. while stirring and add 1.1 equivalents of $CaCl_2$ per equivalent of sodium alkylbenzene sulfonate. Adjust the temperature to between 45° and 50° C. and add 75.5 parts (the first increment) of $Ca(OH)_2$. Begin blowing $CO_2$ through the solution at about 45° C. Add a second increment of $Ca(OH)_2$ while continuing the blowing of $CO_2$ and maintain the temperature between 40° and 50° C. While allowing several minutes between the addition of each increment (and while providing $CO_2$ blowing with each increment) add the third and fourth increments of the $Ca(OH)_2$ for a total of 302 parts of the $Ca(OH)_2$. Increase the temperature to about 150° C. and blow with $N_2$ in order to remove water and alcohols. Filter to obtain product.

EXAMPLE III

Charge into a four necked flask equipped with a stirrer, thermowell, thermometer, subsurface addition tube, and condenser 914 parts of a 500 molecular weight mixed branched monoalkylated benzene sulfonic acid. Add thereto a hydroxy substituted sulfonic acid (60 parts) and a methanol promoter having therein a 50/50 mixture of isobutyl and amyl alcohols (121 parts). The addition of the methanol and alcohol 50/50 mixture being followed by the addition of about 100 parts of a diluent oil. Add to the solution 10 parts of $CaCl_2$ and mix for about 15 minutes. Add 82 parts of $Ca(OH)_2$ and heat to 80° C. for 30 minutes. Strip by heating to 150° C. and blowing with $N_2$ gas. Cool to below 60° C. and add 250 parts of the methanol alcohol mix and 1120 parts of diluent oil. Heat to 40°–50° C. and add 175 parts of $Ca(OH)_2$ and blow with $CO_2$ to carbonate for about 30 minutes. Add an additional 5 increments of $Ca(OH)_2$ 175 grams each and carbonate with $CO_2$ after the addition of each increment. Strip by heating to about 150° C. and $N_2$ gas blow. Filter to obtain the product.

EXAMPLE IV

Charge into a four necked flask equipped with a stirrer, thermowell, thermometer, below surface addition tube and condenser, 500 parts of polypropylenebenzene sulfonic acid. Add 500 parts of an alkyl substituted hydroxy sulfonic acid copromotor. Add 100 parts of an alcohol promoter in the form of a 50/50 mixture of methanol and amyl alcohols. Add 500 parts of a diluent oil. Begin overbasing the polypropylenebenzene sulfonic acid by heating to between 45° and 50° C. and adding incremental amounts of $Ca(OH)_2$ (50 parts) with stirring. Blow with $CO_2$ to carbonate for about 30 minutes. Several increments of $Ca(OH)_2$ can be added with each incremental addition being followed by blowing with $CO_2$ until desired overbasing is accomplished. When desired overbasing is accomplished, heat to 150° C., blow with $N_2$ to remove water and alcohols and filter to obtain product.

EXAMPLE V

Charge into a four necked flask equipped with a stirrer, thermowell, thermometer, below surface addition tube and condenser, 200 parts of a statistical mixture of benzene sulfonic acids where the benzene moiety is substituted with an alkyl substituent and within the mixture the alkyl substituent varies in carbon chain length over a range of from about 4 to 30 carbons. Add 10 parts of an alkyl substituted hydroxy sulfonic acid copromoter. Add 20 parts of an alcohol promoter in the form of a mixture of alcohols ranging in chain length from about 1 to 8 carbons. Add 1000 parts of a diluent oil. Begin overbasing the alkylbenzene sulfonic acid by heating to between 45° and 50° C. and adding incremental amounts of $Ca(OH)_2$ (10 parts) with stirring. Blow with $CO_2$ to carbonate for about 30 minutes. Several increments of $Ca(OH)_2$ can be added with each incremental addition being followed by blowing with $CO_2$ until desired overbasing is accomplished, heat to 150° C., blow with $N_2$ to remove water and alcohols and filter to obtain product.

EXAMPLE VI

Charge into a four necked flask equipped with a stirrer, thermowell, thermometer, below surface addition tube and condenser, 1000 parts of polyisobutylene substituted benzene sulfonic acid. Add 100 parts of a statistical mixture of alkyl substituted hydroxy sulfonic acid copromoter wherein the alkyl substituents vary in carbon number over a range of from 8 to 20 carbon atoms. Add 200 parts of an alcohol promoter in the form of a mixture of 50% methanol, 25% isobutanol and 25% amyl alcohols. Add 500 parts of a diluent oil. Begin overbasing the alkylbenzene sulfonic acid by heating to between 45° and 50° C. and adding incremental amounts of $Ca(OH)_2$ (10 parts) with stirring. Blow with $CO_2$ to carbonate for about 30 minutes. Several increments of $Ca(OH)_2$ can be added with each incremental addition being followed by blowing with $CO_2$ until desired overbasing is accomplished, heat to 150° C., blow with $N_2$ to remove water and alcohols and filter to obtain product.

EXAMPLE VII

Charge into a four necked flask equipped with a stirrer, thermowell, thermometer, below surface addition tube and condenser, 100 parts of polyisobutylene substituted benzene sulfonic acid. Add 10 parts of an polypropylene substituted hydroxy sulfonic acid copromoter. Add 20 parts of an alcohol promoter in the form of a mixture of 50% methanol and 50% amyl alcohols. Add 50 parts of a diluent oil. Begin overbasing the alkylbenzene sulfonic acid by heating to between 45° and 50° C. and adding incremental amounts of $Ca(OH)_2$ (5 parts) with stirring. Blow with $CO_2$ to carbonate for about 30 minutes. Several increments of $Ca(OH)_2$ can be added with each incremental addition being followed by blowing with $CO_2$ until desired overbasing is accomplished. When desired overbasing is accomplished, heat to 150° C., blow with $N_2$ to remove water and alcohols and filter to obtain product.

EXAMPLE VIII

Charge into a four necked flask equipped with a stirrer, thermowell, thermometer, below surface addition tube and condenser, 1000 parts of polyisobutylene substituted benzene sulfonic acid. Add 100 parts of an alkyl substituted hydroxy sulfonic acid copromoter. Add 200 parts of an alcohol promoter in the form of a mixture of 50% methanol, 25% hexanol and 25% amyl alcohols. Add 500 parts of a diluent oil. Overbase the alkylbenzene sulfonic acid by heating to between 45° and 50° C. and gradually adding $Ca(OH)_2$ (1000 parts) with stirring. Heat to 150° C., blow with $N_2$ to remove water and alcohols and filter to obtain product.

EXAMPLE IX

Charge into a four necked flask equipped with a stirrer, thermowell, thermometer, below surface addition tube and condenser, 1000 parts of polyisobutylene substituted benzene sulfonic acid. Add 100 parts of a polypropylene substituted hydroxy sulfonic acid copromoter wherein the polypropylene contains 9-12 carbons. Add 200 parts of an alcohol promoter in the form of a mixture of 20% methanol, 40% hexanol and 40% amyl alcohols. Add 500 parts of a diluent oil. Begin overbasing the alkylbenzene sulfonic acid by heating to between 45° and 50° C. and adding incremental amounts of Ca(OH)$_2$ (100 parts) with stirring. Blow with CO$_2$ to carbonate for about 30 minutes. Several increments of Ca(OH)$_2$ can be added with each incremental addition being followed by blowing with CO$_2$ until desired overbasing is accomplished. When desired overbasing is accomplished, heat to 150° C., blow with N$_2$ to remove water and alcohols and filter to obtain product.

EXAMPLE X

Prepare a calcium mahogany sulfonate by double decomposition of a 60% oil solution of 750 parts of sodium mahogany sulfonate and a solution of 67 parts of calcium chloride and 63 parts of water. Heat this reaction mass for 4 hours at 90°-100° C. to effect the conversion of the sodium mahogany sulfonate to calcium mahogany sulfonate. Then, add 50 parts of calcium hydroxide and heat to 150° C. over a period of five hours. Cool the material to 40° C., and add 98 parts of methanol along with 75 parts of a hydroxy substituted sulfonic acid. Introduce carbon dioxide over a period of 2 hours at 42°-43° C. Remove the water and alcohol by heating the mass to 150° C. and bubbling N$_2$. Filter the solution and obtain the desired carbonated calcium sulfonate overbased material.

EXAMPLE XI

To a reaction flask charge 3,000 parts of an oil solution of a neutral sodium petroleum sulfonate (3.0 eq.) and 180 parts of an aqueous solution of a sodium alkyl hydroxysulfonate (AGS-391) (0.375 eq.). Add to the mixture with stirring and heating a solution of 200 parts CaCl$_2$ in 240 parts H$_2$O. Heat the reaction mixture to reflux and hold for ½ hour and then dry by distilling out the H$_2$O to a temperature of about 150° C. Cool the resultant mixture of Ca sulfonate containing NaCl to 50° C. and add 325 parts of methanol and 180 parts of Ca(OH)$_2$. Carbonate for approximately 2 hours at a rate of 1 cfh of CO$_2$. Strip the reaction mixture by heating to 160° C. while bubbling with N$_2$ at 1 cfh. Filter with diatomaceous earth to yield a product containing about 16.0% CaSO$_4$ ash and having an alkalinity value (ASTM D2896) of about 80.

EXAMPLE XII

Add to a reaction flask 1,000 parts of the calcium overbased sulfonate of Example XI, 580 parts of mineral oil and 55 parts of a calcium salt of formaldehyde coupled alkyl phenol. Stir the mixture and heat to about 45° C. and add 180 parts of methanol and 90 parts of a 50:50 mixture of isobutyl alcohol and amyl alcohols. Add 400 parts of Ca(OH)$_2$ in 4 increments of 100 parts each, each increment of Ca(OH)$_2$ being carbonated at 1cfh for 50-60 minutes. Dry the reaction mixture by heating to 160° C. while sweeping with N$_2$ at 1 cfh to remove alcohol and H$_2$O. Filtered with diatomaceous earth to yield a product containing about 37% CaSO$_4$ ash and an alkalinity value (ASTM D2896) of about 290.

EXAMPLE XIII

Add to a reaction flask 1280 parts of an oil solution of a synthetic alkylbenzene sulfonic acid (1.5 equivalents), 66 parts of an aqueous solution of a sodium alkylhydroxysulfonate (0.14 equivalents) 114 parts of a 50:50 mixture of isobutyl and amyl alcohol and 10.5 parts of a 1000 Mw alkyl succinic anhydride. Stir the mixture and heat to 60° C. Add a solution of 14.0 parts of CaCl$_2$ in 40 parts of H$_2$O. Heat the mixture to 80° C. for 15 minutes and add 90 parts of Ca(OH)$_2$ and heat to reflux temperature for 1 hour. Strip by heating to 150° C. with N$_2$ bubbling at 1.5 cfh for 1 hour. Cool the resultant mixture to about 40° C. and add 225 parts of methanol, 75 parts of a calcium salt of a formaldehyde coupled alkylphenol, 115 parts of a 50:50 mixture of isobutyl and amyl alcohol. Add 4 increments of 145 parts each, (total 580 parts) with each increment of Ca(OH)$_2$ being carbonated at 1.0 cfh for 95 minutes by CO$_2$ bubbling. Dry the reaction mixture by heating to 150° C. while bubbling with N$_2$ at 1.5 scfh to remove alcohol and H$_2$O. Filter with diatomaceous earth to yield a product containing about 40% CaSO$_4$ ash and an alkalinity value (ASTMD-2896) of about 300.

EXAMPLE XIV

Charge into a four necked flask equipped with a stirrer, thermowell, thermometer, below surface addition tube and condenser, 1000 parts of a alkyl substituted benzene sulfonic acid. Add 100 parts of an alkyl substituted hydroxy sulfonic acid copromoter wherein the copromoter is a statistical mixture of compounds wherein the alkyl moiety ranges from 8 to 20 carbon atoms. Add 200 parts of an alcohol promoter in the form of a mixture of 50% methanol and 50% n-butanol. Add 500 parts of a diluent oil. Begin overbasing the alkylbenzene sulfonic acid by heating to between 45° and 50° C. and adding incremental amounts of Ca(OH)$_2$ (50 parts) with stirring. Blow with CO$_2$ to carbonate. Several increments of Ca(OH) can be added with each incremental addition being followed by blowing with CO$_2$ until desired overbasing is accomplished. When desired overbasing is accomplished, heat to 150° C., blow with N$_2$ to remove water and alcohols and filter to obtain product.

All of the above Examples I-XIV can be used by themselves or in combination with the product obtained in any of the other Examples to be added to oil to form a concentrate or a fully formulated lubricating oil product.

The present invention has been disclosed and described herein in what is believed to be its preferred embodiments. However, modifications will occur to those skilled in the art upon reading this disclosure and such modifications are intended to be encompassed by the present invention.

What is claimed:

1. A process for preparing an overbased salt composition, comprising the steps of:
    reacting a basic metal neutralizing agent (A) with a reactant (B) selected from the group consisting of hydrocarbyl substituted sulfonic acids and salts thereof;
    allowing the reacting to proceed in the presence of a compound (C) selected from the group consisting of hydroxy sulfonic acids and salts thereof having the formula:

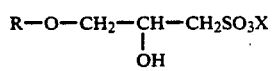

wherein R is a hydrocarbyl moiety and X is selected from the group consisting of H, Na, Mg, Ca, Ba, Li, K and amines; and obtaining the overbased salt composition.

2. The process as claimed in claim 1, wherein the reacting is carried out while carbonating with $CO_2$.

3. The process as claimed in claim 1, wherein R is an alkyl moiety containing 8 to 20 carbons.

4. The process as claimed in claim 1, wherein the molar ratio of the reactant (B) to the hydroxy sulfonic compound (C) is in the range of from about (5–20):(1).

5. The process as claimed in claim 1, wherein the hydrocarbyl moiety of the reactant (B) is an alkyl substituted aromatic moiety.

6. The process as claimed in claim 5, wherein th alkyl substituted aromatic moiety is an 8 to 20 carbon alkyl substituted benzene moiety and the basic metal neutralizing agent is an alkali or alkaline earth metal neutralizing agent.

7. The process as claimed in claim 1, wherein R is an alkyl moiety containing about 8 to about 20 carbon atoms and the molar ratio of the reactant (B) to the compound (C) is in the range of from about (10):(1) and wherein the reacting is carried out in the presence of an alcohol.

8. The process as claimed in claim 2, wherein the carbonating is carried out at a temperature in the range of from about 0° C. to about 200° C. in the presence of an alcohol containing 1 to 10 carbon atoms.

9. An overbased salt composition prepared by:

reacting a basic metal neutralizing agent (A) with a reactant (B) selected from the group consisting of hydrocarbyl substituted sulfonic acids and salts thereof;

allowing the reacting to proceed in the presence of a compound (C) selected from the group consisting of hydoxy sulfonic acids and salts thereof having the formula:

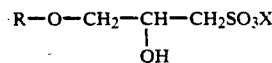

wherein R is a hydrocarbyl moiety and X is selected from the group consisting of H, Na, Mg, Ca, Ba, Li, K and amines; and obtaining the overbased salt composition.

10. The overbased salt composition as claimed in claim 9, wherein the reacting is carried out while carbonating with $CO_2$ at a temperature in the range of about 20° C. to about 80° C. and the neutralizing agent is an alkali or alkaline earth metal neutralizing agent.

11. The overbased salt composition as claimed in claim 9, wherein the reactant (B) includes a hydrocarbyl moiety selected from the group consisting of alkyl moieties containing 1 to 30 carbons and aromatic and alkyl substituted aromatic moieties containing 6 to 30 carbons, and in the compound (C) R is an alkyl moiety containing 8 to 20 carbon atoms.

12. The overbased salt composition as claimed in claim 9, wherein the compound (C) is present in an amount of 0.05 moles to 0.2 moles per mole of the reactant (B) and wherein the reactant (B) includes a hydrocarbyl moiety which is a polymeric alkyl moiety comprised of repeating units selected from the group consisting of ethyl, propyl, butyl and isobutyl.

13. A mixed overbased salt having the formula:

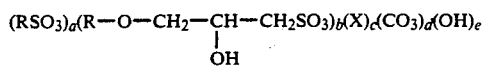

wherein each R is independently hydrocarbyl, c is 1 to 4000, and a, b, d, and e vary in order to satisfy the valence requirement of $(X)_c$, wherein X is an alkali or alkaline earth metal, with the proviso that a and b are each at least one and the salt is overbased.

14. A lubricating composition comprised of a major amount of an oil of lubricating viscosity and a minor amount of an overbased salt composition produced by:

reacting a basic metal neutralizing agent (A) with a reactant (B) selected from the group consisting of hydrocarbyl substituted sulfonic acids and salts thereof;

allowing the reacting to proceed in the presence of a compound (C) selected from the group consisting of hydroxy sulfonic acids and salts thereof having the formula:

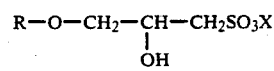

wherein R is a hydrocarbyl moiety and X is selected from the group consisting of H, Na, Mg, Ca, Ba, Li, K and amines; and obtaining the overbased salt composition.

15. A lubricating composition comprised of a major amount of an oil of lubricating viscosity and a minor amount of a mixed overbased salt having the formula:

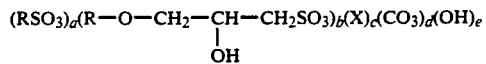

wherein each R is independently hydrocarbyl, c is 1 to 4000, and a, b, d, and e vary in order to satisfy the valence requirement of $(X)_c$, wherein X is an alkali or alkaline earth metal, with the proviso that a and b are each at least one and the salt is overbased.

* * * * *